United States Patent

[11] 3,622,862

[72] Inventor Carl Ingvar Boksjo
 Ludvika, Sweden
[21] Appl. No. 82,956
[22] Filed Oct. 22, 1970
[45] Patented Nov. 23, 1971
[73] Assignee Allmanna Svenska Elektriska Aktiebolaget
 Vasteras, Sweden

[54] BY-PASS CONNECTION OF STATIC CONVERTERS
 7 Claims, 4 Drawing Figs.
[52] U.S. Cl. ................................................. 321/11,
 307/85, 321/13
[51] Int. Cl. ................................................. H02m 1/18
[50] Field of Search ........................................ 321/11–13,
 27; 307/85–87, 252 P

[56] References Cited
 UNITED STATES PATENTS
 2,532,108  11/1950  Lamm ......................... 321/11

| 2,612,629 | 9/1952 | Alexanderson et al. ...... | 321/11 |
| 3,087,106 | 4/1963 | Baude et al. .................. | 321/11 |

FOREIGN PATENTS

| 1,163,507 | 9/1969 | Great Britain ................ | 321/13 |

Primary Examiner—William H. Beha, Jr.
Attorney—Jennings Bailey, Jr.

ABSTRACT: A static converter composed of a converter-transformer and a rectifier bridge connected thereto has a bypass member connected in parallel with the bridge. Two series-connected rectifiers in one phase of the bridge constitute a bypass path. A direct voltage source can be connected with said two bypass rectifiers, the source having such a polarity as to furnish a current in the conducting direction of the two rectifiers.

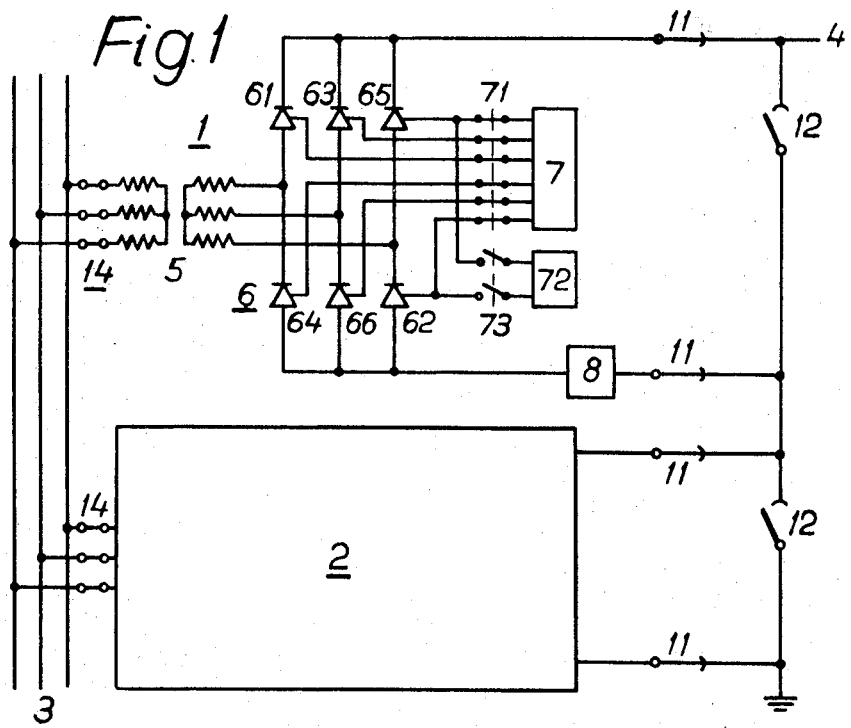
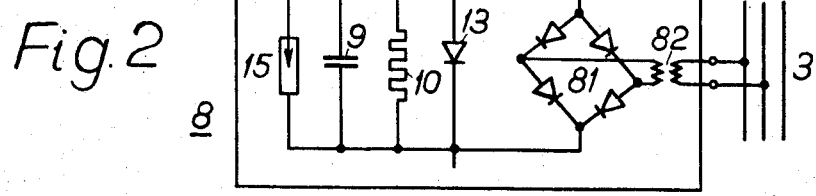
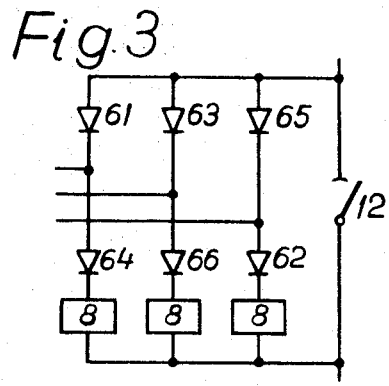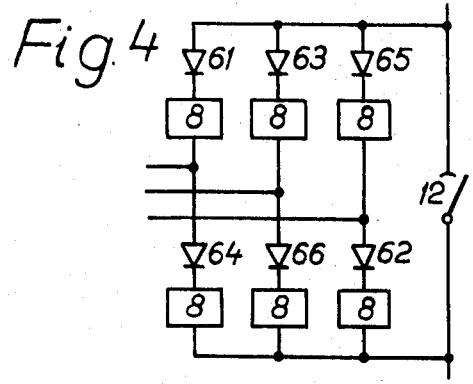

BY-PASS CONNECTION OF STATIC CONVERTERS

BACKGROUND OF THE INVENTION

1. Field of the Invention

The present invention relates to a static converter comprising a converter-transformer and a rectifier group comprising a number of main rectifiers in bridge-connection parallel-connected with a bypass member, usually in the form of an isolator, two series-connected rectifiers in one phase of the bridge being intended to function simultaneously as so-called bypass routes.

2. The Prior Art

The object of such a bypass member is to allow the converter itself to be made voltageless and currentless in order to disconnect it. Such a disconnection may be necessary because of a fault in the converter or it may be a routine step for purposes of inspection or because of a voltage drop.

In most converters there is also a bypass rectifier for this purpose connected in parallel with the bridge and the bypass isolator, and it is advisable to have a bypass rectifier for instance to relieve such rectifier faults as back-firing in ionic rectifiers. However, if back-firing can be avoided—for example semiconductor rectifiers must simply be dimensioned and protected so that back-firing does not occur—the bypass rectifier can easily be left out and two series-connected rectifiers used in a phase of the rectifier bridge as a bypass route. The device will then operate as follows: when a converter is being disconnected, first the two rectifiers in the bypass route will fire, after which the bypass isolator, often called the bypass knife, closes and the bypass path becomes currentless. Finally, with the help of additional isolators, the entire converter can be disconnected from the DC network. In order to make the converter completely voltageless it must then also be disconnected from the AC network.

Upon reconnection the converter is connected both to the DC and the AC network. The bypass knife is then opened at the same time that the control electrodes of the bypass rectifiers receive voltage. When the bypass knife opens, an arc arises in it, the voltage drop of which is used to ignite the bypass rectifiers, and, when the isolator is completely opened, the bypass rectifiers will take over the entire current. The normal control pulses are then supplied for the rectifiers in the converter so that normal commutation starts and normal operation is obtained.

With increasing demands for current and voltage in the converter, all the components become larger and at the same time the current strength in the arc in the bypass knife increases. This naturally causes great strain on the knife and it must be dimensioned accordingly.

Furthermore, if one of the rectifiers in the bypass route should miss its ignition, the opening movement of the isolator must be interrupted and reversed which causes considerable wear on the contacts. If rapid isolators are used of the oil breaker type, such a reversal involves the risk of explosion.

SUMMARY OF THE INVENTION

The object of the present invention is to ensure sufficient ignition voltage for the bypass rectifiers and at the same time to decrease the demands on the isolator. According to the invention this is achieved by connecting a direct voltage source in series with at least one of the bypass valves, the direct voltage source being so connected that it tends to cause a current flow in the conducting direction of the bypass rectifier. In this way the bypass rectifier has a better chance of firing so that it conducts a certain low-current even before the isolator is opened. When the isolator is opened the direct current will commutate over from this isolator to the bypass rectifier without large arcs arising. The strain on the isolator is thus limited. Under these circumstances the isolator may also be designed as a rapid isolator or breaker, thus enabling rapid connection of a converter.

The direct voltage source is preferably in the form of a rectifier bridge in series with the bypass rectifiers and is fed from the AC network through a transformer. The rectifier bridge can be connected in various ways and is protected in various ways against overvoltages and overloading.

BRIEF DESCRIPTION OF THE DRAWINGS

Further objects and advantages of the invention will appear more fully from the following description, especially when taken in conjunction with the accompanying drawings, in which:

FIG. 1 shows a converter station comprising two converters having bypass rectifiers equipped according to the invention, while FIG. 2 shows the direct voltage source in more detail. FIG. 3 and 4 show different designs of the connection of the direct voltage source according to FIG. 1.

DESCRIPTION OF THE PREFERRED EMBODIMENTS

FIG. 1 shows a converter station comprising two converters 1 and 2 which are connected in parallel on the AC side to an AC network 3, whereas on the DC side they are connected in series between a DC conductor 4 and earth. The converter 1 is shown in detail and comprises a converter transformer 5 and a rectifier bridge 6 with rectifiers 61–66. The converters are connected by means of isolators 11 to the DC conductor 4 and earth. A bypass member in the form of an isolator 12 is also connected on the DC side in parallel with each converter.

The rectifiers in the rectifier bridge 6 are normally controlled from a control pulse generator 7, of the type shown, for example, in Ekstrom application Ser. No. 779,368, filed Nov. 27, 1968, which is connected by means of contacts 71 to the control electrodes of the rectifiers. In the drawings the rectifiers are shown symbolically as single rectifiers whereas each branch in the case of semiconductor rectifiers consists of a large number of series and parallel-connected thyristors or diodes corresponding to the rated voltage and rated current of the rectifier.

FIG. 1 also shows an extra control device 72 which can be connected by means of contacts 73 to the rectifiers 65 and 62, which can thus be used as bypass rectifiers.

During operation or if a fault occurs in the converter, the contacts 71 are opened and the contacts 73 closed. The control device 72, which may be simply a voltage source or maybe another control pulse generator, thus delivers control voltage to the rectifiers 62 and 65 which thus form a bypass route for the other rectifiers and the DC side of the converter is short-circuited. The isolator 12 is then closed so that the bypass rectifiers become currentless and the entire converter can be disconnected from the DC transmission line with the help of the isolator 11. It is also possible to disconnect the converter from the AC network with the help of the breaker 14 on the AC side of the converter, so that the converter becomes voltageless and any work can be carried out on it. When the converter is again to be connected, it is connected on the DC and AC sides to both the networks and the control device 72 is activated. When the isolator 12 then opens, an arc will arise in it and the voltage drop in this arc will appear over the anodes and cathodes in the bypass rectifiers 62 and 65 which are thus ignited.

The control pulse generator 7 gives control pulses in synchronism with the AC network 3, which means that the rectifiers 62 and 65 will never have control pulses simultaneously from the generator 7. The control pulses from 7 to the two rectifiers must always be displaced 180° in relation to each other.

When 62 and 65 are to operate as a bypass connection they must both have control voltage at the same time from the control voltage source 72, either in the form of a constant direct voltage or in the form of control pulses with rather high-frequency.

If the converter is very large it will require considerably voltage over the anodes and cathodes in the bypass rectifiers 62, 65 in order to ignite these rectifiers and a certain arc voltage drop in the isolator 12 is thus required. At the same time the arc must, at least in the first place, conduct the entire direct current of the station. In order to facilitate ignition of the bypass rectifiers, a direct voltage source 8 is connected in series with the rectifier bridge.

This direct voltage source 8 is simply connected at the same time that the switch 73 is closed, and this can be done by hand or the two maneuvers can be connected together in some way for the sake of convenience.

This direct voltage source 8, shown in FIG. 2, consists of a rectifier bridge 81 fed by a transformer 82 connected to the AC network 3. The DC source is suitably so dimensioned that it is capable of igniting the bypass rectifiers even before the isolator 12 has opened. In this way the main current will simply commutate over into the bypass rectifiers when the isolator 12 is opened without any serious arc arising in the isolator. When the bypass rectifiers have taken over the main current, the rectifier bridge 81 will have the main current flowing through it and the resistor 83 is provided in order to limit this current. This resistor also prevents a large direct current from arising in the transformer winding. In order to prevent a high-blocking voltage from arising across the rectifier bridge 81, this bridge is parallel-connected with a resistor 10. Furthermore, the rectifier bridge is parallel connected with a capacitor 9 in order to protect the rectifiers in the bridge against the current which grows up during ignition of the bypass rectifiers.

Finally the rectifier bridge 81 is parallel-connected with a diode connection 13 (shown only as a diode) which, when the bypass rectifiers have ignited, will conduct the entire main current whereas the rectifier bridge 81 will only conduct the current from the transformer 82. In this way only the diode connection 13 need be dimensioned for the main current of the converter. FIG. 2 also shows how the rectifier bridge 81 and diode 13 can be protected against over-voltages with the help of an over-voltage protection means in the form of a lightning arrester protection means 15.

In FIG. 1 the direct voltage source 8 is connected in series with the whole rectifier bridge. It is instead possible to connect such a direct voltage source in each phase of the rectifier bridge, as shown in FIG. 3. In this case the extra control device 72 may be connected to any pair of rectifiers in the three phases. In FIG. 4 yet another step has been taken and the direct voltage sources are connected in series with each rectifier. In all three cases shown the direct voltage source(s) must be activated at the same time that the extra control device 72 is connected.

I claim:

1. Static converter comprising a converter-transformer (5) and a rectifier bridge (6) connected thereto, a bypass member, the rectifier-bridge being connected in parallel with the bypass member (12), two series-connected rectifiers (62,65) in one phase of the bridge being intended to operate as a bypass path, comprising a direct voltage source (8), means connecting said two bypass rectifiers in series with said direct voltage source, said direct voltage source having such polarity that it tends to furnish a current in the conducting direction of the bypass rectifiers.

2. Static converter according to claim 1, in which connecting means connects said direct voltage source in series with the whole converter rectifier-bridge.

3. Static converter according to claim 1, including a rectifier connected in parallel with said direct voltage source having the same conducting direction as the bypass rectifiers.

4. Static converter according to claim 1, including a capacitor connected in parallel with said direct voltage source.

5. Static converter according to claim 1, comprising a resistor connected in parallel with said direct voltage source.

6. Static converter according to claim 1, comprising an overvoltage protection connected in parallel with said direct voltage source.

7. Static converter according to claim 1 having a control pulse generator connected to all said rectifiers, means to disconnect the control pulse generator from the rectifiers, and a control device for supplying control voltage to said two bypass rectifiers when said control pulse generator is disconnected.

* * * * *